(12) United States Patent
Ran et al.

(10) Patent No.: US 8,909,548 B1
(45) Date of Patent: Dec. 9, 2014

(54) TECHNIQUE FOR PROVIDING FINANCIAL-TRANSACTION INFORMATION

(75) Inventors: Alexander S. Ran, Palo Alto, CA (US); Siddharth Ram, Menlo Park, CA (US)

(73) Assignee: Intuit Inc., Mountain View, CA (US)

( * ) Notice: Subject to any disclaimer, the term of this patent is extended or adjusted under 35 U.S.C. 154(b) by 284 days.

(21) Appl. No.: 12/771,222

(22) Filed: Apr. 30, 2010

(51) Int. Cl.
*G06Q 40/00* (2012.01)

(52) U.S. Cl.
USPC ............................... 705/30; 705/304

(58) Field of Classification Search
CPC combination set(s) only.
See application file for complete search history.

(56) References Cited

U.S. PATENT DOCUMENTS

| | | | | |
|---|---|---|---|---|
| 7,370,011 | B2 * | 5/2008 | Bennett et al. | 705/39 |
| 2005/0097190 | A1 * | 5/2005 | Abdelhak | 709/217 |
| 2005/0234819 | A1 * | 10/2005 | Ueno et al. | 705/40 |
| 2006/0107314 | A1 * | 5/2006 | Cataldi | 726/15 |
| 2007/0005495 | A1 * | 1/2007 | Kim | 705/40 |
| 2007/0225998 | A1 * | 9/2007 | Howell | 705/1 |
| 2009/0006584 | A1 * | 1/2009 | Gregoire et al. | 709/220 |
| 2010/0306094 | A1 * | 12/2010 | Homer et al. | 705/35 |
| 2011/0107265 | A1 * | 5/2011 | Buchanan et al. | 715/835 |

FOREIGN PATENT DOCUMENTS

KR 2006067183 * 6/2006 ............ G06F 17/00

* cited by examiner

*Primary Examiner* — Luna Champagne
(74) *Attorney, Agent, or Firm* — Park, Vaughan, Fleming & Dowler LLP; Steven E. Stupp

(57) ABSTRACT

A technique for providing information about financial transactions is described. This information technique allows a user, who has conducted financial transactions with one or more other parties, to access information about these financial transactions that is maintained by a provider of financial software, which is used by the one or more other parties to manage the information about the financial transactions. In particular, in this technique, in response to an access request from the user, a portal (such as a web page), which includes the information about the financial transactions between the user and the one or more other parties, is provided by the provider of the financial software to the user.

21 Claims, 6 Drawing Sheets

TECHNIQUE FOR PROVIDING FINANCIAL-TRANSACTION INFORMATION

BACKGROUND

The present disclosure relates to techniques for providing information associated with financial transactions.

Financial software is increasingly used by entities (such as individuals, organizations and businesses) to aggregate and process information associated with financial transactions that are conducted between the entities and other parties. This powerful class of tools, which encompasses diverse applications such as inventory-management software, customer-management software, accounting software and income-tax software, allows an entity to perform essential functions, such as: conducting business operations, increasing sales, monitoring cashflow and preparing income-tax returns. In other words, financial software provides 'situational awareness' about the information to the entity, which, in turn, helps the entity make informed decisions and become more profitable and efficient.

However, this situational awareness is not extended to the other parties in the financial transactions. In particular, even though the financial transactions are conducted between the entity and the other parties, the financial software typically only allows the entity to access the aggregated and processed information. Consequently, the other parties in the financial transactions are not able to leverage the financial software used by the entity to make decisions or to be more efficient, which can limit the advantages provided by the financial software to the entity, as well as the other parties.

SUMMARY

The disclosed embodiments relate to a computer system that provides information about financial transactions. During operation, the computer system receives an access request from a user. In response to the access request, the computer system provides a portal that includes the information about the financial transactions between the user and one or more other parties. This information about the financial transactions is maintained by a provider of financial software to the one or more other parties, and the financial software is used by the one or more other parties to manage the information about the financial transactions.

Note that the user may have a business relationship with one or more of the other parties. Consequently, the information about the financial transactions may include: customer information, an invoice, a payment, a proposal, a quote, an income-tax return, and/or a business document. Furthermore, the one or more other parties may include a variety of entities, such as: businesses, financial institutions, and/or government agencies.

In some embodiments, the portal may include a web page. Additionally, the financial software may include: inventory-management software, customer-management software, accounting software and/or income-tax software.

In some embodiments, after providing the portal, the computer system receives an instruction from the user to complete a task associated with one of the financial transactions. Alternatively or additionally, after providing the portal, the computer system may receive an instruction from the user to correct an error in the information about a financial transaction. Furthermore, after providing the portal, the computer system may receive a query from the user regarding delivery of a product or a service associated with at least one of the financial transactions.

In some embodiments, prior to providing the portal, the computer system receives permission from the one or more other parties to provide the information about the financial transactions to the user.

Another embodiment provides a method that includes at least some of the operations performed by the computer system.

Another embodiment provides a computer-program product for use with the computer system. This computer-program product includes instructions for at least some of the operations performed by the computer system.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Embodiments of a computer system, a technique for providing information about financial transactions, and a computer-program product (e.g., software) for use with the computer system are described. This information technique allows a user, who has conducted financial transactions with one or more other parties, to access information about these financial transactions that is maintained by a provider of financial software, which is used by the one or more other parties to manage the information about the financial transactions. In particular, in this technique, in response to an access request from the user, a portal (such as a web page), which includes the information about the financial transactions between the user and the one or more other parties, is provided by the provider of the financial software to the user.

By providing the information about the financial transactions to the user, the information technique provides situation awareness to the user, which allows the user to leverage the advantages of the financial software. This may benefit the user, as well as the one or more other parties. For example, based on the provided information, the user may realize that a delivery hasn't occurred even though payment was provided, or the user may realize that they haven't paid an outstanding invoice. Thus, the user may provide an instruction to the provider of the financial software (who, in turn, may forward it to an appropriate one of the other parties) to provide more information or to complete a task associated with one of the financial transactions. Similarly, based on the provided information, the user may identify and correct an error in the information about a financial transaction. In this way, the information technique may improve customer service and/or communication between the user and the one or more other parties. In addition, the information technique may improve the satisfaction of the one or more other parties and/or the user with the financial software, which may improve customer retention and/or sales of the financial software.

In the discussion that follows, the one or more other parties may include a variety of entities, such as: businesses, financial institutions, and/or government agencies. Furthermore, a 'business' should be understood to include: for-profit corporations, non-profit corporations, organizations, groups of individuals, sole proprietors, government agencies, partnerships, etc. In addition, because the user may have a business relationship with one or more of the other parties, the user may be a customer of a product or a service provided by the one or more of the other parties, a supplier or a vendor of a product or a service to the one or more of the other parties, and/or a contractor who provides a service to the one or more of the other parties.

Figure 1:
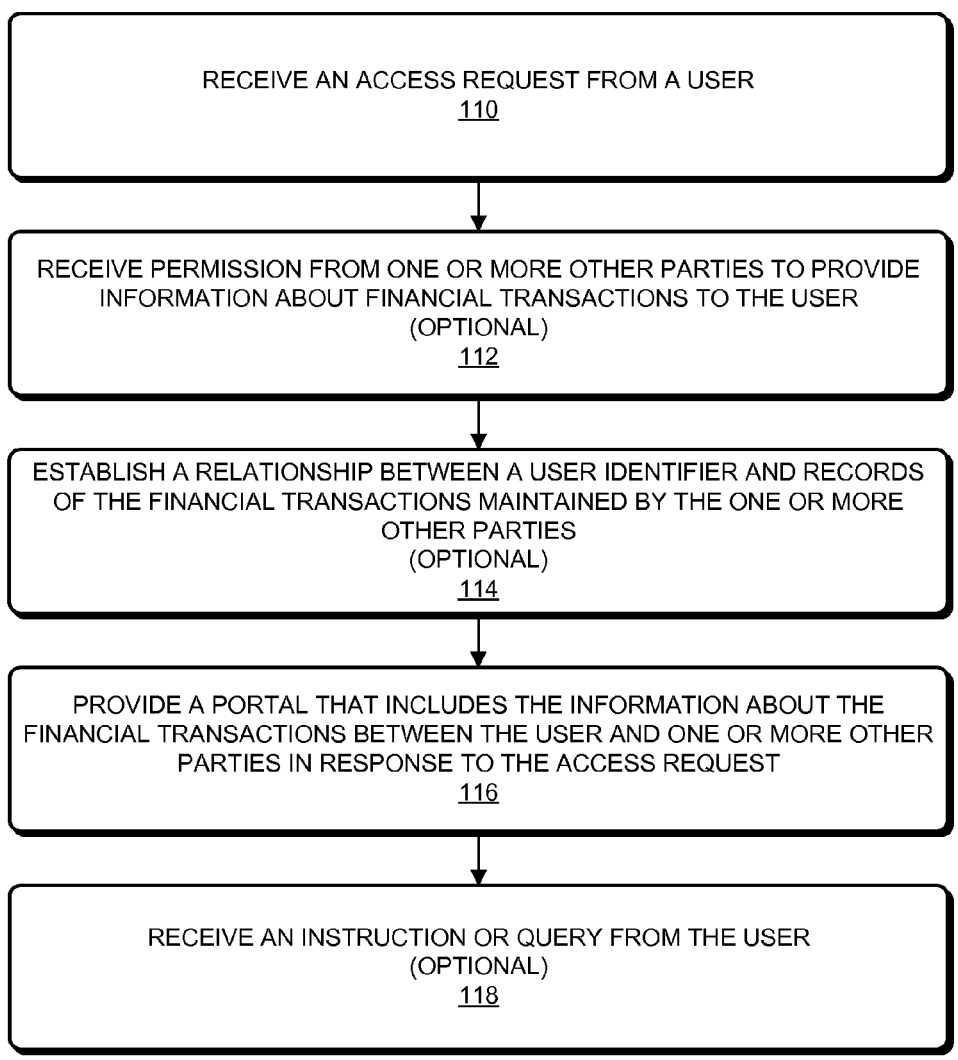
FIG. 1 is a flow chart illustrating a method for providing information about financial transactions in accordance with an embodiment of the present disclosure.

We now describe embodiments of the information technique. FIG. 1 presents a flow chart illustrating a method 100 for providing information about financial transactions, which may be performed by a computer system (such as computer system 400 in FIG. 4 or computer system 500 in FIG. 5). During operation, the computer system receives an access request from a user (operation 110). In response to the access request, the computer system provides a portal that includes the information about the financial transactions between the user and one or more other parties (operation 116). This information about the financial transactions is maintained by a provider of financial software to the one or more other parties, and the financial software is used by the one or more other parties to manage the information about the financial transactions.

Note that the information about the financial transactions may include: customer information, an invoice, a payment, a proposal, a quote, an income-tax return, and/or a business document. In addition, the financial software may include a variety of applications, such as: inventory-management software, customer-management software, accounting software and/or income-tax software.

In some embodiments, prior to providing the portal (operation 116), the computer system optionally receives permission from the one or more other parties to provide the information about the financial transactions to the user (operation 112). Moreover, after receiving the optional permission, the computer system may optionally establish a relationship between a user identifier associated with the user (such as an account number, a user name or another personal identifier) and records of the financial transactions maintained by the one or more other parties (operation 114). For example, the computer system may determine a mapping from the user identifier and the records. This is useful when the user is not represented by or have an explicit identifier in the records. A wide variety of techniques may be used to implement the mapping depending on the financial-records management system(s) used by the one or more other parties and how business transactions are represented. If the user's name or other identifying information are included in the financial records, then such identifying information can be used to search the financial records. Alternatively, the user may provide a specific pin, keyword or name(s) by which they are or may be known in the financial-record management system(s). Ultimately, the mapping depends on how the business relationship between the user and the other parties was established and how it is represented in the records of the financial transactions that are maintained by the one or more other parties. Thus, the one or more other parties may hold the key (literally) to identifying the financial records representing information about financial transaction with the user.

In some embodiments, the mapping involves the computer system creating an identity associated with the user in response to the request received in operation 110. Then, the user may provide additional information that facilitates the mapping (such as names and other identifiers by which the user may be referred to in the financial records maintained by the one or more other parties with whom the user had or has a business relationship, as well as names and other identifiers of the one or more other parties). Next, the computer system may use the information provided by the user to obtain keys from the one or more other parties for identifying the financial records that are associated with the financial or business transactions between the user and the one or more other parties.

Furthermore, after providing the portal (operation 116), the computer system may receive an optional instruction or query from the user (operation 118). For example, the optional instruction may include: an instruction to complete a task associated with one of the financial transactions and/or an instruction to correct an error in the information about a financial transaction. Similarly, the query may concern delivery of a product or a service associated with at least one of the financial transactions (such as a request for information about a delivery time or date).

Thus, the information technique may facilitate financial transactions (and, more generally, commerce) between the user and the one or more other parties. In particular, the portal may allow the user to review the information about the financial transactions, which may allow the user: to comment on or add to the information, to correct errors in the information, to make a payment, etc. For example, the user can review a project and fix any discrepancies. Alternatively or additionally, the user can request status information for a product that the user has paid for but hasn't received yet.

Figure 2:
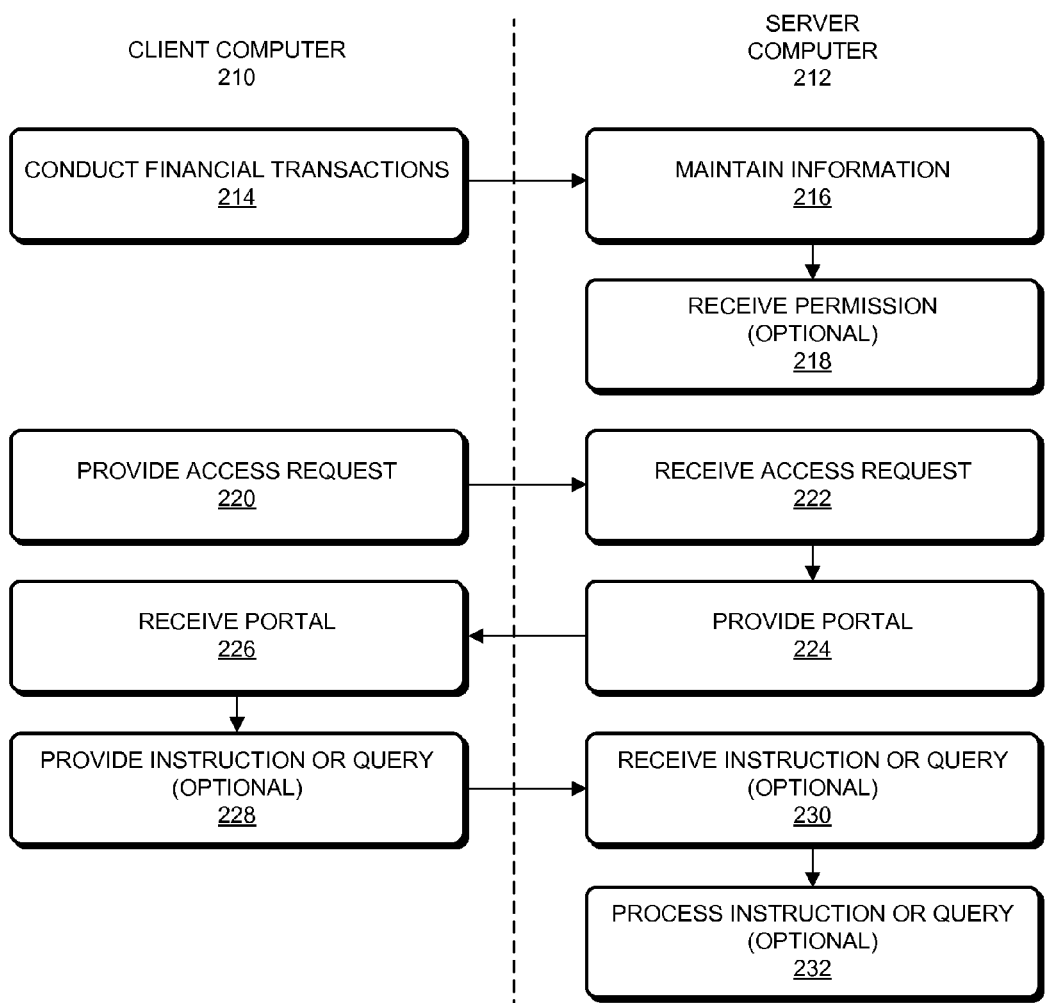
FIG. 2 is a flow chart illustrating the method of FIG. 1 in accordance with an embodiment of the present disclosure.

In an exemplary embodiment, the information technique is implemented using one or more client computers and at least one server computer, which communicate through a network, such as the Internet (i.e., using a client-server architecture). This is illustrated in FIG. 2, which presents a flow chart illustrating method 100 for providing information about financial transactions. During this method, a user of client computer 210 conducts one or more financial transactions with one or more other parties (operation 214), and information about these financial transactions is maintained by financial software (operation 216) that is executed by server 212. Note that the one or more other parties may use the financial software to manage the information about the financial transactions, and server 212 may be associated with a provider of the financial software.

Subsequently, one or more of the other parties may optionally provide permission to provide the information to the user, which is received (operation 218) by server 212. Then, when an access request provided by the user (operation 220) is received (operation 222), server 212 may provide a portal to the user (operation 224) that includes the information about the financial transactions.

The user may receive the portal (operation 226), and may use it to review the information and/or to perform remedial action. For example, the user may optionally provide an instruction or a query (operation 228), which is optionally processed (operation 232) by server 212 after it is received (operation 230).

In some embodiments of method 100 (FIGS. 1 and 2) there may be additional or fewer operations. Moreover, the order of the operations may be changed, and/or two or more operations may be combined into a single operation.

In an exemplary embodiment, Tom's pet-care store uses web-based accounting software to help manage his business. Using this financial software, he sends an invoice to one of his customers, Sarah. For example, the invoice may be associated with a HyperText Markup Language (HTML) link in an email. When Sarah activates the link (for example, by clicking on it using a mouse), a dialog box may be displayed that offers to create a portal for her that will "aggregate all of the information about her interactions with Tom's pet-care store and with other companies she does business with, such as Bill's car wash."

Using this portal, Sarah can manage her interactions with the businesses that are included in the portal (which, ideally, will include many or all of the businesses with whom she interacts). For example, she can use the portal to: view invoices (such as the invoice from Tom's pet-care store), correct errors in invoices, pay invoices, request more information from businesses (such as a delivery date), etc.

Thus, the portal can provide a single location with the information Sarah needs about her financial transactions with multiple businesses. While the preceding embodiments described aggregating information associated with financial software from a provider, in some embodiments the portal provides information associated with multiple financial-software products that are provided by multiple, different providers. In this way, the portal may encompass an even larger set of businesses (and, more generally, other parties), thereby enhancing its usefulness to Sarah and the businesses. Consequently, the information technique may constitute a service to existing customers, such as Tom's pet-care store, and may be a way for the provider of the financial software (in this example, the web-based accounting software) to expand their business to new customers, such as Sarah.

Figure 3:
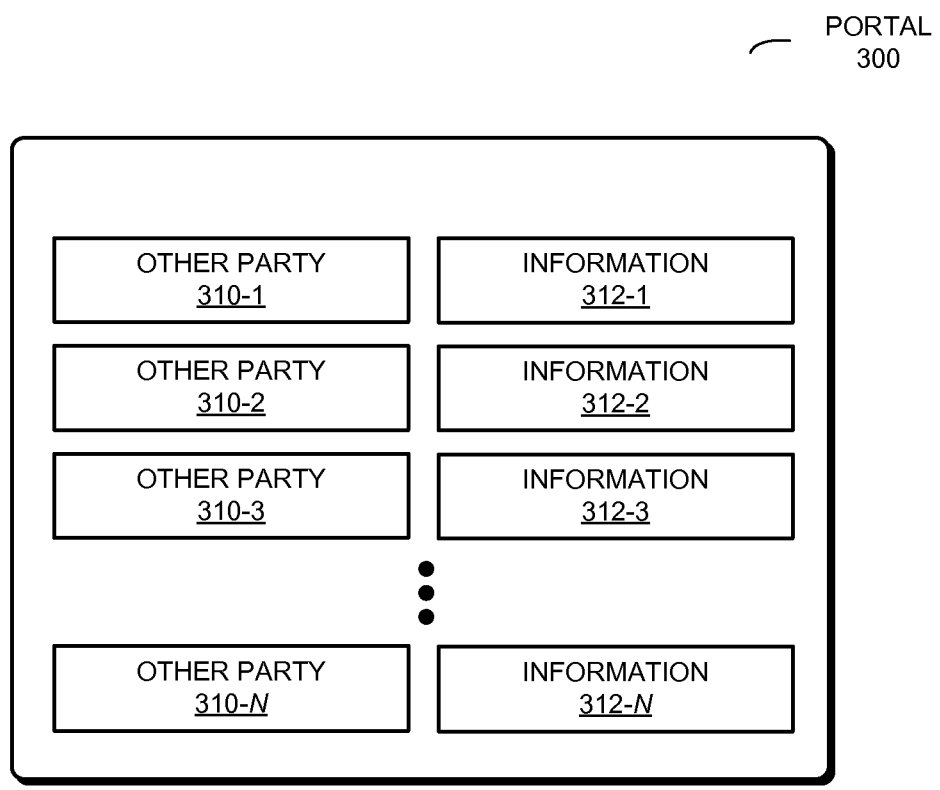
FIG. 3 is a drawing of a portal in accordance with an embodiment of the present disclosure.

We now describe embodiments of the portal. FIG. 3 presents a drawing of a portal 300, such as a web page, which may be displayed on a computer or computer system (such as computer system 400 in FIG. 4 or computer system 500 in FIG. 5). This portal may include a list of multiple other parties 310, such as: businesses (which are often used as illustrative examples in this discussion), financial institutions, and/or government agencies. For each of the other parties (such as other party 310-1), information 312 about financial transactions with the user is also provided. Thus, portal 300 provides a concise summary of the information about the financial transactions between the user and the other parties.

Figure 4:
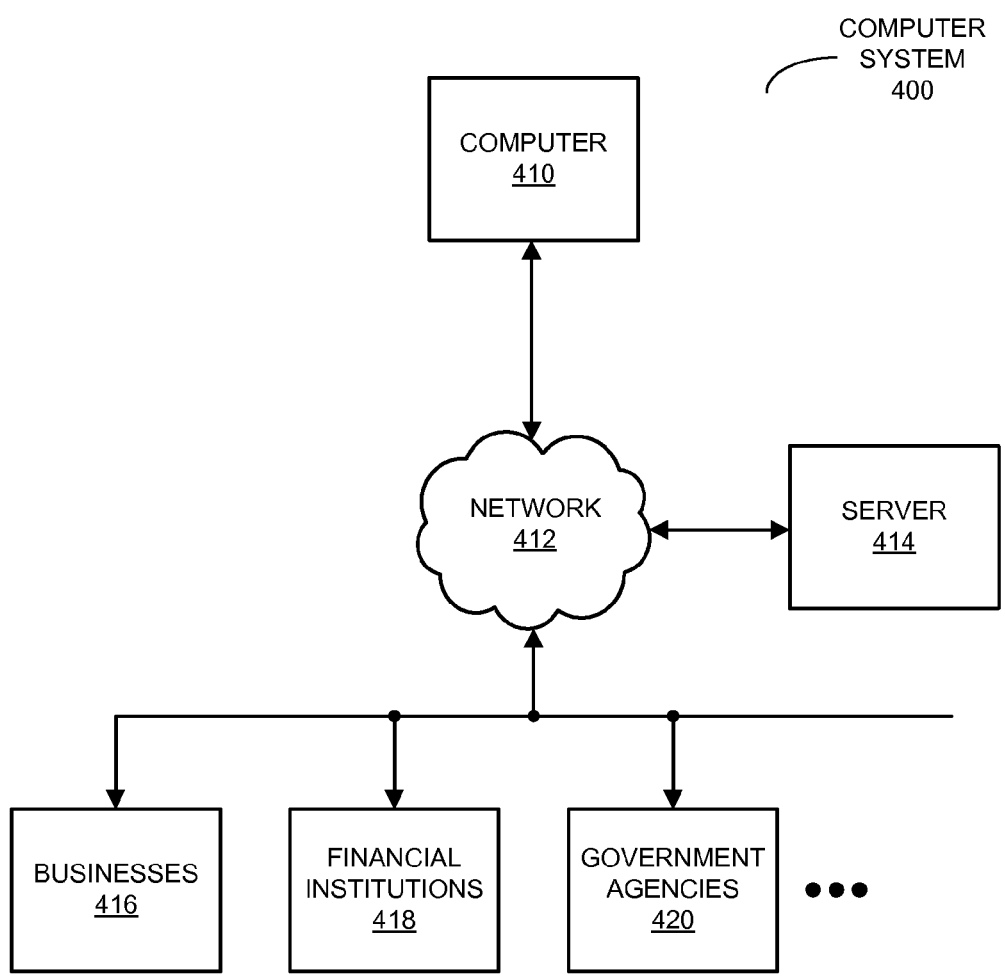
FIG. 4 is a block diagram illustrating a computer system that performs the method of FIGS. 1 and 2 in accordance with an embodiment of the present disclosure.

We now describe embodiments of the computer system and its use. FIG. 4 presents a block diagram illustrating a computer system 400 that performs method 100 (FIGS. 1 and 2). In this system, a user of computer 410 may use a web browser, which is installed and which executes on computer 410, to provide the access request to server 414 via network 412. For example, the user may provide the access request by interacting with a web page that is provided by server 414. Alternatively, the user may provide the access request using financial software, such as a financial-software application that is resident on and that executes on computer 410. This financial-software application may be a stand-alone application or a portion of another application that is resident on and which executes on computer 410.

In some embodiments, at least a portion of the financial-software application may be an application tool (such as a financial-software application tool) that is embedded in the web page (and which executes in a virtual environment of the web browser). In an illustrative embodiment, the financial-software application tool is a software package written in: JavaScript™ (a trademark of Oracle Corporation), e.g., the financial-software application tool includes programs or procedures containing JavaScript instructions, ECMAScript (the specification for which is published by the European Computer Manufacturers Association International), VBScript™ (a trademark of Microsoft Corporation) or any other client-side scripting language. In other words, the embedded financial-software application tool may include programs or procedures containing. JavaScript, ECMAScript instructions, VBScript instructions, or instructions in another programming language suitable for rendering by the web browser or another client application (such as on computer 410). Thus, the financial-software application may be provided to the user via a client-server architecture.

As discussed previously, in response to the access request, server 414 may provide the portal, such as another web page, which is rendered by the web browser or the financial-software application on computer 410. This portal may include information about financial transactions between the user and multiple other parties that use the financial software, such as: businesses 416, financial institutions 418 and/or government agencies 420. As also noted previously, these other parties may provide permission, via network 412, to server 414 to allow the information about financial transactions between the user and the other parties to be included in the portal.

Subsequently, the user may interact with the portal (for example, using the web browser or the financial-software application) to provide one or more instructions or queries to server 414 via network 412.

Note that the information in computer system 400 (such as the information about the financial transactions) may be stored at one or more locations in computer system 400 (i.e., locally or remotely). Moreover, because this information may be sensitive in nature, it may be encrypted. For example, stored information and/or information communicated via network 412 may be encrypted.

Figure 5:
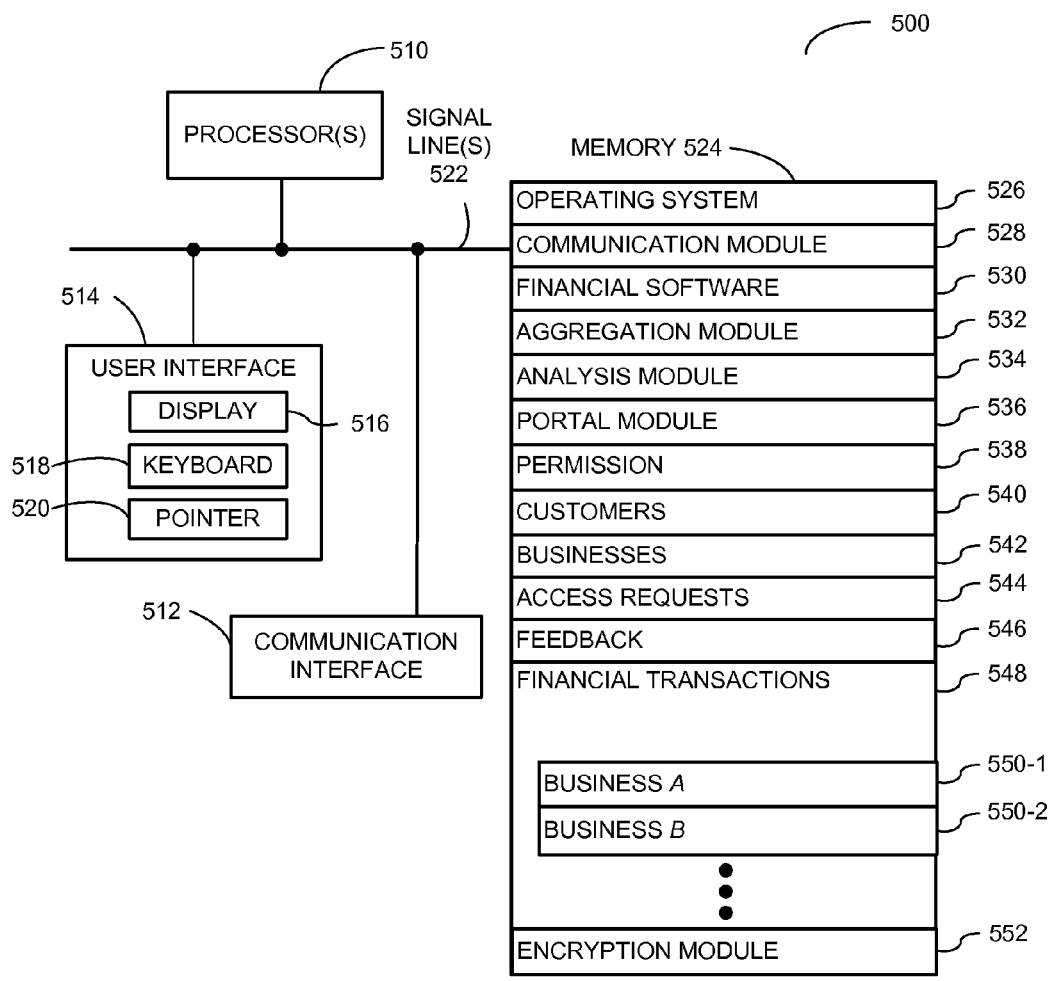
FIG. 5 is a block diagram illustrating a computer system that performs the method of FIGS. 1 and 2 in accordance with an embodiment of the present disclosure.

FIG. 5 presents a block diagram illustrating a computer system 500 that performs method 100 (FIGS. 1 and 2), such as server 414 (FIG. 4). Computer system 500 includes one or more processing units or processors 510, a communication interface 512, a user interface 514, and one or more signal lines 522 coupling these components together. Note that the one or more processors 510 may support parallel processing and/or multi-threaded operation, the communication interface 512 may have a persistent communication connection, and the one or more signal lines 522 may constitute a communication bus. Moreover, the user interface 514 may include: a display 516, a keyboard 518, and/or a pointer 520, such as a mouse.

Memory 524 in computer system 500 may include volatile memory and/or non-volatile memory. More specifically, memory 524 may include: ROM, RAM, EPROM, EEPROM, flash memory, one or more smart cards, one or more magnetic disc storage devices, and/or one or more optical storage devices. Memory 524 may store an operating system 526 that includes procedures (or a set of instructions) for handling various basic system services for performing hardware-dependent tasks. Memory 524 may also store procedures (or a set of instructions) in a communication module 528. These communication procedures may be used for communicating with one or more computers and/or servers, including computers and/or servers that are remotely located with respect to computer system 500. While not shown in FIG. 5, in some embodiments memory 524 includes a web browser.

Memory 524 may also include multiple program modules (or sets of instructions), including: financial software 530 (or a set of instructions), aggregation module 532 (or a set of instructions), analysis module 534 (or a set of instructions), portal module 536 (or a set of instructions), and/or encryption module 552 (or a set of instructions). Note that one or more of these program modules (or sets of instructions) may constitute a computer-program mechanism.

During financial transactions between one or more customers 540 and one or more businesses 542, financial software 530 may collect information about the financial transactions. In particular, one or more of businesses 542 may use financial software 530 to help manage their businesses. Therefore, based on instructions from financial software 530, aggregation module 532 may collect the information, and analysis module 534 may analyze the information (for example, to determine invoices, financial summaries, income-tax returns, etc.). This information may be stored in a data structure, such as that for financial transactions 548, which includes information about financial transactions for business A 550-1 and business B 550-2.

Figure 6:
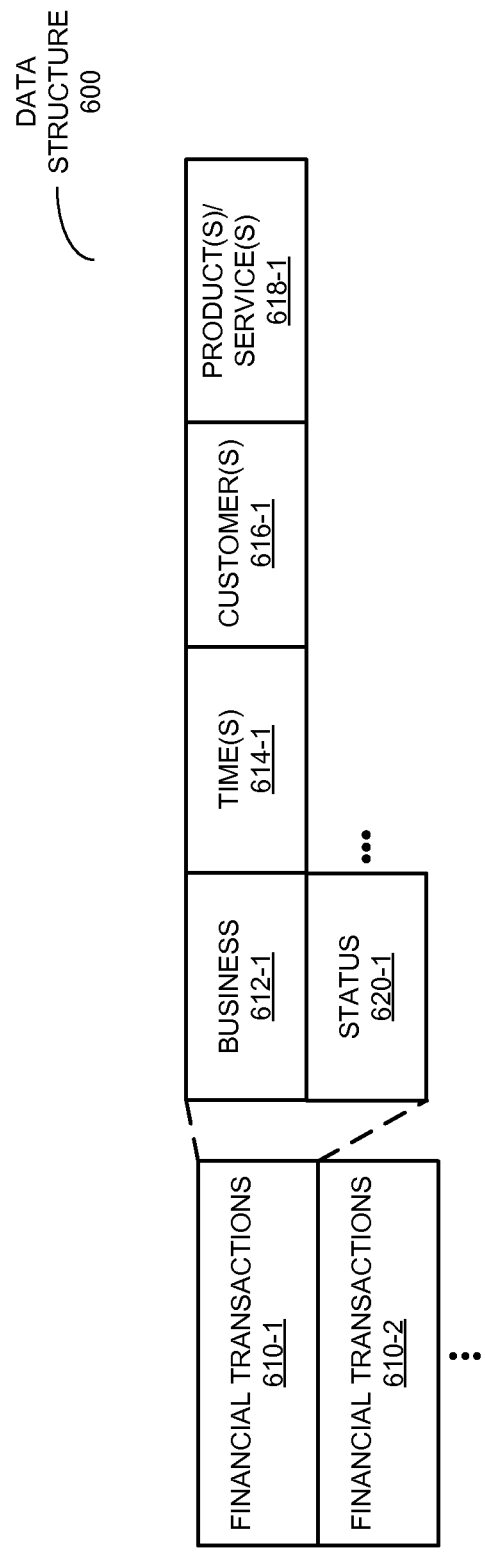
FIG. 6 is a block diagram illustrating a data structure for use in the computer system of FIG. 5 in accordance with an embodiment of the present disclosure.

This data structure is shown in FIG. 6, which presents a block diagram illustrating a data structure 600. In particular, data structure 600 may include information about financial transactions 610 for different businesses (and, more generally, other parties, which use financial software 530). For example, financial transactions 610-1 may include: an associated business 612-1, one or more times 614-1 of financial transactions 610-1, one or more customers 616-1 that conducted financial transactions 610-1 with business 612-1, one or more products/services 618-1 associated with financial transactions 610-1, and status 620-1 information (such as invoice paid, invoice outstanding, product delivered, delivery pending, etc.).

Referring back to FIG. 5, the one or more businesses 542-1 may optionally provide permission 538 for one or more of customers 540 to access the information about financial transactions 548 that is maintained by financial software 530. Then, in response to one or more access requests 544 that are received from corresponding customers 540, portal module 536 may extract the relevant information for these customers from the financial-transactions data structure, and may provide this information to the corresponding customers 540 using portals (such as web pages).

In some embodiments, customers 540 provide optional feedback 546 in response to the information included in one or more of the portals. For example, feedback 546 may include an instruction or a query from a given customer or user. More generally, feedback 546 may include remedial action in response to the information included in one or more of the portals.

Furthermore, because the information about the financial transactions may be sensitive in nature, in some embodiments at least some of the information stored in memory 524 and/or at least some of the information communicated using communication module 528 is encrypted using encryption module 552. Additionally, in some embodiments one or more of the modules in memory 524 may be included in financial software 530.

Instructions in the various modules in memory 524 may be implemented in: a high-level procedural language, an object-oriented programming language, and/or in an assembly or machine language. Note that the programming language may be compiled or interpreted, e.g., configurable or configured, to be executed by the one or more processors 510.

Although computer system 500 is illustrated as having a number of discrete items, FIG. 5 is intended to be a functional description of the various features that may be present in computer system 500 rather than a structural schematic of the embodiments described herein. In practice, and as recognized by those of ordinary skill in the art, the functions of computer system 500 may be distributed over a large number of servers or computers, with various groups of the servers or computers performing particular subsets of the functions. In some embodiments, some or all of the functionality of computer system 500 may be implemented in one or more application-specific integrated circuits (ASICs) and/or one or more digital signal processors (DSPs).

Computers and servers in computer systems 400 (FIG. 4) and/or 500 may include one of a variety of devices capable of manipulating computer-readable data or communicating such data between two or more computing systems over a network, including: a personal computer, a laptop computer, a mainframe computer, a portable electronic device (such as a cellular phone or PDA), a server and/or a client computer (in a client-server architecture). Moreover, network 412 (FIG. 4) may include: the Internet, World Wide Web (WWW), an intranet, LAN, WAN, MAN, or a combination of networks, or other technology enabling communication between computing systems.

In exemplary embodiments, the financial-software application (i.e., financial software 530) includes: Quicken™ and/or TurboTax™ (from Intuit, Inc., of Mountain View, Calif.), Microsoft Money™ (from Microsoft Corporation, of Redmond, Wash.), SplashMoney™ (from SplashData, Inc., of Los Gatos, Calif.), Mvelopes™ (from In2M, Inc., of Draper, Utah), and/or open-source applications such as Gnucash™, PLCash™, Budget™ (from Snowmint Creative Solutions, LLC, of St. Paul, Minn.), and/or other planning software capable of processing financial information.

Moreover, the financial-software application may include software such as: QuickBooks™ (from Intuit, Inc., of Mountain View, Calif.), Peachtree™ (from The Sage Group PLC, of Newcastle Upon Tyne, the United Kingdom), Peachtree Complete™ (from The Sage Group PLC, of Newcastle Upon Tyne, the United Kingdom), MYOB Business Essentials™ (from MYOB US, Inc., of Rockaway, N.J.), NetSuite Small Business Accounting™ (from NetSuite, Inc., of San Mateo, Calif.), Cougar Mountain™ (from Cougar Mountain Software, of Boise, Id.), Microsoft Office Accounting™ (from Microsoft Corporation, of Redmond, Wash.), Simply Accounting™ (from The Sage Group PLC, of Newcastle Upon Tyne, the United Kingdom), CYMA IV Accounting™ (from CYMA Systems, Inc., of Tempe, Ariz.), DacEasy™ (from Sage Software SB, Inc., of Lawrenceville, Ga.), Microsoft Money™ (from Microsoft Corporation, of Redmond, Wash.), Tally.ERP (from Tally Solutions, Ltd., of Bangalore, India) and/or other payroll or accounting software capable of processing payroll information.

Portal 300 (FIG. 3), computer system 400 (FIG. 4), computer system 500 (FIG. 5) and/or data structure 600 may include fewer components or additional components. Moreover, two or more components may be combined into a single component, and/or a position of one or more components may be changed. In some embodiments, the functionality of computer systems 400 (FIG. 4) and/or 500 may be implemented more in hardware and less in software, or less in hardware and more in software, as is known in the art.

While the preceding discussion used information about financial transactions as an illustrative example, in other embodiments the information technique may allow another party to share information about other people, which is aggregated by software that is used by the other party, with the other people. For example, a teaching institution (such as a school) may share information about students with: the students, their parents and/or their guardians. Similarly, financial professionals (such as accountants) and/or government agencies may share information about financial statements and/or income-tax returns. In this way, the information technique may facilitate improved situational awareness, thereby allowing all the parties that are associated with the information that is aggregated by the software to access it, and to leverage the benefits accorded by the software.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A computer-implemented method for providing information about financial transactions, comprising:
    sending information, from a first party in a set of parties to a customer of the first party, about a financial transaction between the customer of the first party and the first party, wherein the information includes an offer to create a portal for the customer of the first party by a provider of a financial software, wherein each party in the set of parties is a customer of the provider of the financial software, wherein each party in the set of parties uses the financial software to manage financial transactions, and wherein the customer of the first party is not a customer of the provider of the financial software;
    receiving, at the provider of the financial software, a response from the customer of the first party regarding the financial transaction, wherein the response includes a permission to create the portal for the customer of the first party;
    creating a user identifier for the customer of the first party;
    using the user identifier to identify financial transactions of the customer with the first party and a second party in the set of parties, wherein the financial transactions are associated with the user identifier;
    creating the portal, wherein the portal includes information about the identified financial transactions of the first party and the second party, and wherein the information about the financial transactions is maintained by the provider of financial software; and
    providing the portal to the user.

2. The method of claim 1, wherein the user has a business relationship with second party.

3. The method of claim 1, wherein the portal includes a web page.

4. The method of claim 1, wherein the information about the financial transactions includes customer information, an invoice, a payment, a proposal, a quote, an income-tax return, or a business document.

5. The method of claim 1, wherein the set of parties include businesses, financial institutions, or government agencies.

6. The method of claim 1, wherein the financial software includes inventory-management software, customer-management software, accounting software or income-tax software.

7. The method of claim 1, wherein, after providing the portal, the method further includes receiving an instruction from the user to complete a task associated with one of the financial transactions.

8. The method of claim 1, wherein, after providing the portal, the method further includes receiving an instruction from the user to correct an error in the information about a financial transaction.

9. The method of claim 1, wherein, after providing the portal, the method further includes receiving a query from the user regarding delivery of a product or a service associated with at least one of the financial transactions.

10. The method of claim 1, wherein prior to providing the portal, the method further includes receiving permission from the second party to provide the information about the financial transactions to the user.

11. A non-transitory computer-program product for use in conjunction with a computer system, the computer-program product comprising a computer-readable storage medium and a computer-program mechanism embedded therein for providing information about financial transactions, the computer-program mechanism including:
    instructions for sending information, from a first party in a set of parties to a customer of the first party, about a financial transaction between the customer of the first party, and the first party, wherein the information includes an offer to create a portal for the customer of the first party by a provider of a financial software, wherein each party in the set of parties is a customer of the provider of the financial software, wherein each party in the set of parties uses the financial software to manage financial transactions, and wherein the customer of the first party is not a customer of the provider of the financial software;
    instructions for receiving, at the provider of the financial software, a response from the customer of the first party regarding the financial transaction, wherein the response includes a permission to create the portal for the customer of the first party;
    instructions for creating a user identifier for the customer of the first party;
    instructions for using the user identifier to identify financial transactions of the customer with the first party and a second party in the set of parties, wherein the financial transactions are associated with the user identifier;
    instructions for creating the portal, wherein the portal includes information about the identified financial transactions of the first party and a second party, and wherein the information about the financial transactions is maintained by the provider of financial software; and
    instructions for providing the portal to the user.

12. The computer-program product of claim 11, wherein the user has a business relationship with the second party.

13. The computer-program product of claim 11, wherein the portal includes a web page.

14. The computer-program product of claim 11, wherein the information about the financial transactions includes customer information, an invoice, a payment, a proposal, a quote, an income-tax return, or a business document.

15. The computer-program product of claim 11, wherein the set of parties include businesses, financial institutions, or government agencies.

16. The computer-program product of claim 11, wherein the financial software includes inventory-management software, customer-management software, accounting software or income-tax software.

17. The computer-program product of claim 11, wherein, after the instructions for providing the portal, the computer-program mechanism further includes instructions for receiving an instruction from the user to complete a task associated with one of the financial transactions.

18. The computer-program product of claim 11, wherein, after the instructions for providing the portal, the computer-program mechanism further includes instructions for receiving an instruction from the user to correct an error in the information about a financial transaction.

19. The computer-program product of claim 11, wherein, after the instructions for providing the portal, the computer-program mechanism further includes instructions for receiving a query from the user regarding delivery of a product or a service associated with at least one of the financial transactions.

20. The computer-program product of claim 11, wherein, prior to the instructions for providing the portal, the computer-program mechanism further includes instructions for receiving permission from the second party to provide the information about the financial transactions to the user.

21. A computer system, comprising:
   a processor;
   memory; and
   a program module, wherein the program module is stored in the memory and configurable to be executed by the processor, the program module including:
      instructions for sending information, from a first party in a set of parties, to a customer of the first party, about a financial transaction between the customer of the first party and the first party, wherein the information includes an offer to create a portal for customer of the first party by a provider of financial software, wherein each part in the set of parties is a customer of the provider of the financial software, wherein each party in the set of parties uses the financial software to manage financial transactions, and wherein the customer of the first party is not a customer of the provider of the financial software;
      instructions for receiving, at the provider of the financial software, a response from the customer of the first party regarding the financial transaction, wherein the response involves providing permission to create the portal for the customer of the first party;
      instructions for creating a user identifier for customer of the first party;
      instructions for using the user identifier to identify financial transactions of the customer with the first party and a second party in the set of parties, wherein the financial transactions are associated with the user identifier;
      instructions for creating the portal, wherein the portal includes information about the identified financial transactions of the first party and the second party, and wherein the information about the financial transactions is maintained by a provider of financial software; and
      instructions for providing the portal to the user.

* * * * *